United States Patent
Choi et al.

(10) Patent No.: US 12,537,678 B2
(45) Date of Patent: Jan. 27, 2026

(54) SECURITY DEVICE AND OPERATION METHOD THEREOF

(71) Applicant: Samsung Electronics Co., Ltd., Suwon-si (KR)

(72) Inventors: Gwangbae Choi, Suwon-si (KR); Jisoo Kim, Suwon-si (KR); Sungho Yoon, Suwon-si (KR); Younsung Chu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/763,526

(22) Filed: Jul. 3, 2024

(65) Prior Publication Data

US 2025/0175330 A1    May 29, 2025

(30) Foreign Application Priority Data

Nov. 23, 2023  (KR) .......................... 10-2023-0164864

(51) Int. Cl.
| | |
|---|---|
| *H04L 29/06* | (2006.01) |
| *G06F 21/00* | (2013.01) |
| *H04L 9/08* | (2006.01) |
| *H04L 9/16* | (2006.01) |

(52) U.S. Cl.
CPC .............. *H04L 9/0869* (2013.01); *H04L 9/16* (2013.01); *H04L 2209/08* (2013.01)

(58) Field of Classification Search
None
See application file for complete search history.

(56) References Cited

U.S. PATENT DOCUMENTS

| | | | | |
|---|---|---|---|---|
| 7,620,781 | B2* | 11/2009 | Breternitz, Jr. ...... | G06F 12/0864 707/999.102 |
| 7,865,608 | B1* | 1/2011 | Schuba ................. | H04L 43/026 709/231 |
| 8,639,017 | B1* | 1/2014 | Anderson .......... | G06V 30/2253 382/137 |
| 9,092,447 | B1* | 7/2015 | Anderson .......... | G06Q 30/0185 |
| 11,005,950 | B1* | 5/2021 | Lambert ................ | H04L 65/611 |
| 2014/0108435 | A1* | 4/2014 | Kolesnikov ........... | G06F 16/245 707/754 |
| 2020/0285634 | A1 | 9/2020 | Jho et al. | |
| 2022/0292489 | A1 | 9/2022 | Mackay et al. | |

(Continued)

FOREIGN PATENT DOCUMENTS

| | | |
|---|---|---|
| KR | 10-2020-0107662 A | 9/2020 |
| WO | 2023/285050 A1 | 1/2023 |
| WO | 2023/027982 A1 | 3/2023 |

*Primary Examiner* — Lisa C Lewis
(74) *Attorney, Agent, or Firm* — Fish & Richardson P.C.

(57) ABSTRACT

Disclosed is a security device which includes a memory and a processor connected with the memory to execute at least one instruction. The processor is configured to execute the at least one instruction to cause the security device to generate a plurality of pieces of combination data by combing input data and a plurality of masks, each of which is uniquely assigned to one of a plurality of sub-bloom filters, obtaining a plurality of hash values, based on inputting the plurality of pieces of combination data into one hash function common to the plurality of sub-bloom filters, and determining whether the input data is duplicated based on the plurality of hash values.

20 Claims, 15 Drawing Sheets

(56) References Cited

U.S. PATENT DOCUMENTS

| | | |
|---|---|---|
| 2023/0155820 A1 | 5/2023 | Wang et al. |
| 2023/0205920 A1 | 6/2023 | French et al. |
| 2023/0231698 A1 | 7/2023 | Yeo et al. |
| 2024/0393964 A1* | 11/2024 | Panda ................ G11C 11/40622 |
| 2025/0156292 A1* | 5/2025 | Bogtob ............... G06F 11/3082 |

* cited by examiner

SECURITY DEVICE AND OPERATION METHOD THEREOF

CROSS-REFERENCE TO RELATED APPLICATIONS

This application claims priority under 35 U.S.C. § 119 to Korean Patent Application No. 10-2023-0164864 filed on Nov. 23, 2023, in the Korean Intellectual Property Office, the disclosures of which are incorporated by reference herein in their entireties.

BACKGROUND

Various example embodiments described herein relate to a security device and/or an operation method thereof.

A cryptosystem for encryption/decryption of data may need or use a salt or a nonce which should be used only once. When a random nonce or salt is used, the cryptosystem may be secured such that a duplicated value is not used stochastically. However, when a problem with the scheme and/or operation of generating the random value occurs in the cryptosystem, sufficient randomness may not be secured. Thus, there may be a need or a desire to track a used nonce although the random nonce is used.

SUMMARY

Various example embodiments provide a security device for efficiently verifying a nonce and an operation method thereof.

According to various example embodiments, a security device may include a memory and a processor connected with the memory and configured to execute at least one instruction. The processor may be configured to execute the at least one instruction to cause the security device to generate a plurality of pieces of combination data by combining input data and a plurality of masks, each of the plurality of masks uniquely assigned to one of a plurality of sub-bloom filters, to obtain a plurality of hash values based on inputting the plurality of pieces of combination data into one hash function common to the plurality of sub-bloom filters, and to determine whether the input data is duplicated based on the plurality of hash values.

Alternatively or additionally according to various example embodiments, an operation method of a security device may include generating a plurality of pieces of combination data by combining input data and a plurality of masks, each of which is uniquely assigned to one of a plurality of sub-bloom filters, obtaining a plurality of hash values based on inputting the plurality of pieces of combination data into one hash function common to the plurality of sub-bloom filters, and determining whether the input data is duplicated based on the plurality of hash values.

Alternatively or additionally according to various example embodiments, a security device may include a random number generator configured to generate a random number, an encryption engine configured to perform encryption of plaintext data based on a unique key and the random number to output ciphertext data, and a verification engine configured to determine whether the random number is duplicated. The verification engine may be configured to generate a plurality of pieces of combination data by combining the random number and a plurality of masks, each of the plurality of masks uniquely assigned to one of a plurality of sub-bloom filters, to, to obtain a plurality of hash values based on inputting the plurality of pieces of combination data into one hash function common to the plurality of sub-bloom filters, and to determine whether the random number is duplicated based on the plurality of hash values.

BRIEF DESCRIPTION OF THE FIGURES

The above and other objects and features of various example embodiments will become apparent by describing in detail embodiments thereof with reference to the accompanying drawings.

DETAILED DESCRIPTION

Hereinafter, various example embodiments may be described in detail and clearly to such an extent that an ordinary one in the art easily implements inventive concepts.

Figure 1:
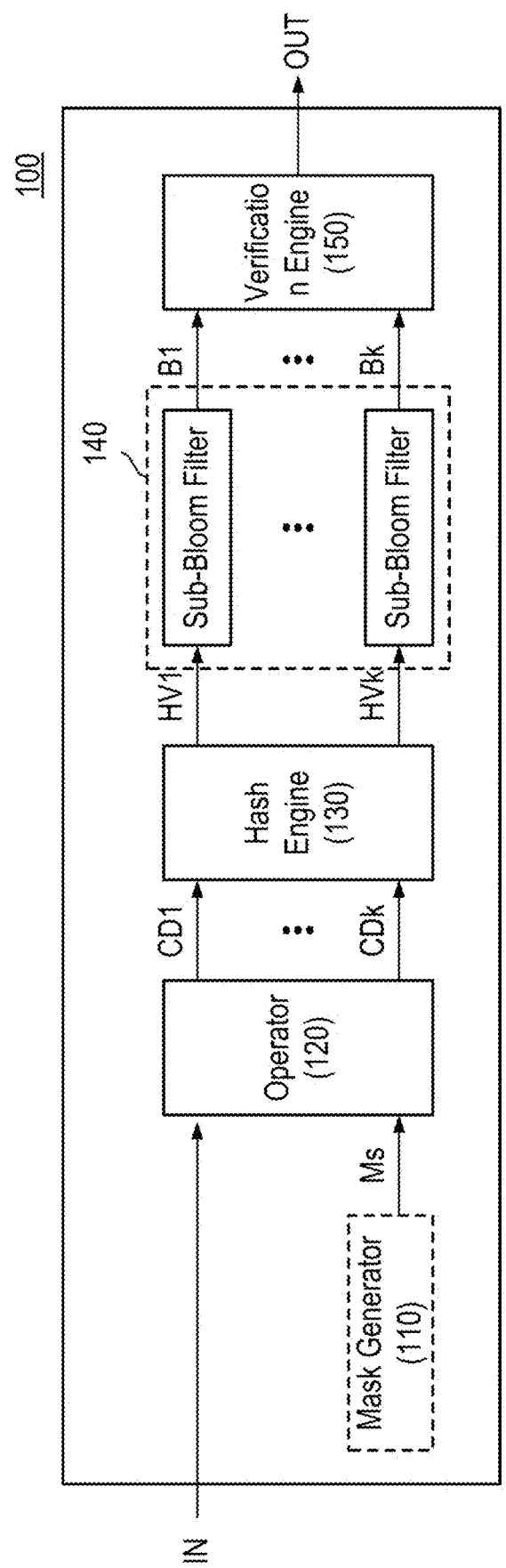
FIG. 1 illustrates a verification device of the present disclosure according to some example embodiments.

FIG. 1 illustrates a verification device of inventive concepts according to some example embodiments.

Referring to FIG. 1, a verification device 100 may be configured to verify whether input data IN is duplicated. Particularly, when the input data IN is a nonce which is a random value used in encryption or signature authentication, the nonce needs to be or should be tracked when sufficient randomness is not secured. The verification device 100 may track and verify whether the nonce is duplicated, thus preventing or reducing the likelihood of the nonce from being reused.

The verification device 100 according to some example embodiments may include a mask generator 110, an operator 120 (or an operator circuit), a hash engine 130, a plurality of sub-bloom filters 140, and a verification engine 150.

The mask generator 110 may generate a plurality of masks Ms (or logical masks) and may provide the operator 120 with the plurality of generated masks Ms. For example, the mask generator 110 may be implemented based on a random number generator. In some example embodiments, the mask generator 110 may generate the plurality of masks Ms, each of which has a random value. Each of the plurality of generated masks Ms may be uniquely assigned to one of the plurality of sub-bloom filters 140. In some cases, the plurality of masks Ms may correspond to different sub-bloom filters, respectively.

As will be described below, as each mask is input as an input value of one hash function common to the plurality of sub-bloom filters 140, each mask may serve to distinguish the plurality of sub-bloom filters 140.

Furthermore, according to some example embodiments, the mask generator 110 may be omitted. When the mask generator 110 is omitted, the verification device 100 may receive and use a plurality of masks Ms randomly generated from an external device (e.g., a random number generator and/or the like) connected with the verification device 100.

The operator 120 may receive the plurality of masks Ms generated from the mask generator 110 and may receive the input data IN, and may combine the input data IN and the plurality of masks Ms to generate a plurality of pieces of combination data CD1 to CDk.

For example, the operator 120 may generate the plurality of pieces of combination data CD1 to CDk based on XORing the input data IN and each of the plurality of mask Ms. Alternatively or additionally, the operator 120 may generate the plurality of pieces of combination data CD1 to CDk based on concatenating each of the plurality of mask Ms to the input data IN. In some example embodiments, the operator 120 may combine the input data IN and each of the plurality of masks Ms in various manners to generate the plurality of pieces of combination data CD1 to CDk, each of which is distinguishable.

When the number of the plurality of sub-bloom filters 140, which will be described below, is k (where k is a natural number greater than or equal to one), the operator 120 may generate k pieces of combination data.

The operator 120 may provide the hash engine 130 with the plurality of pieces of generated combination data CD1 to CDk.

The hash engine 130 may receive the plurality of pieces of combination data CD1 to CDk from the operator 120, and may obtain a plurality of hash values HV1 to HVk, based on inputting the plurality of pieces of combination data CD1 to CDk into one hash function common to the plurality of sub-bloom filters 140. In some example embodiments, the hash engine 130 may input each of the plurality of pieces of combination data CD1 to CDk into one hash function and may obtain hash values or hash signatures respectively corresponding to the plurality of pieces of combination data CD1 to CDk.

One of the plurality of hash values HV1 to HVk may correspond to one index including one of the plurality of sub-bloom filters 140. The plurality of hash values HV1 to HVk may be matched with one sub-bloom filter not to be duplicated with each other. In some example embodiments, each of the plurality of hash values HV1 to HVk for one piece of input data IN may indicate an index of the matched any one sub-bloom filter. Particularly, as the plurality of pieces of combination data CD1 to CDk used to obtain the hash values are distinguished from each other by using the plurality of masks Ms, the plurality of masks Ms may cause the plurality of hash values HV1 to HVk not to be duplicated with each other. Thus, although one hash function is used, the plurality of hash values HV1 to HVk input to the one hash function may be distinguished from each other by using the masks and the plurality of sub-bloom filters 140 matched with the plurality of hash values HV1 to HVk may also be distinguished from each other.

The plurality of sub-bloom filters 140 may include k sub-bloom filters, one of which has a data size of m (where m is a natural number greater than or equal to one). Each sub-bloom filter may be defined as a probabilistic data structure of a plurality of bits. A bit included in each sub-bloom filter may have an index corresponding to the hash value provided from the hash engine 130 When each bit included in each sub-bloom filter corresponds to the hash value provided from the hash engine 130, this may indicate a logic high (or a logic low). Alternatively, when each bit included in each sub-bloom filter does not correspond to the hash value provided from the hash engine 130, this may indicate a logic low (or a logic high).

In terms of each sub-bloom filter, that one sub-bloom filter indicates the logic low may indicate that one hash value is not registered yet (e.g., that the duplicating of one hash value is a negative). Alternatively, that one sub-bloom filter indicates the logic high may mean that one hash value is already registered (e.g., that the duplicating of one hash value is a positive).

The plurality of sub-bloom filters 140 which are a set of the above-mentioned unit sub-bloom filters may be used to register (or store) input data IN, for example, an element, and may determine whether the input data IN is already registered (or stored). Particularly, as described above, the plurality of sub-bloom filters 140 according to some example embodiments may use only one hash function common to all the sub-bloom filters.

The plurality of sub-bloom filters 140 may provide the verification engine 150 with a plurality of pieces of bit information B1 to Bk indicating whether bits of indexes corresponding to the plurality of hash values HV1 to HVk are logic lows or logic highs. Each of the pieces of bit information may indicate a logic state of a bit of a specific index in one sub-bloom filter.

The verification engine 150 may AND the plurality of pieces of bit information B1 to Bk provided from the plurality of sub-bloom filters 140. Thus, the verification engine 150 may output the logic low as the ANDed result, when any one of the plurality of pieces of bit information B1 to Bk is the logic low, and may output the logic high, when all the plurality of pieces of bit information B1 to Bk are the logic highs.

That the verification engine 150 outputs the logic high may indicate that the input data IN is already registered in the plurality of sub-bloom filters 140 (e.g., that the duplicating of the input data is the positive). Conversely, that the verification engine 150 outputs the logic low may indicate that the input data IN is not registered yet in the plurality of sub-bloom filters 140 (e.g., that the duplicating of the input data is the negative). However, due to the characteristics of the bloom filter, the positive may also imply a false positive. However, when the input data IN is a nonce, considering the nature of the nonce in which it is important not to be reused, when only the negative is able to be determined with certainty by using the verification device 100, this may not matter whether there is a false positive. This may improve overall performance.

The verification engine 150 may finally determine whether the input data IN is duplicated depending on the positive or the negative and may output output data OUT corresponding to the determination. When whether duplication indicates the positive, the verification engine 150 may output the output data OUT for requesting the external device connected with the verification device 100 to re-generate input data IN. Alternatively, when duplication indicates is the negative, the verification engine 150 may output the received input data IN as it is as output data OUT.

For example, when the input data IN is the nonce, the verification engine 150 may output the nonce as it is because the nonce is not reused.

According to various example embodiments, the verification device 100 may verify whether the input data IN is registered in the plurality of sub-bloom filters 140, thus preventing or reducing the likelihood of the input data IN being reused. Particularly, the verification device 100 of various embodiments may verify whether the input data IN is duplicated although using only one hash function common to the plurality of sub-bloom filters 140 by using of the mask and the plurality of sub-bloom filters 140, thus improving the efficiency of the verification operation.

Figure 2:
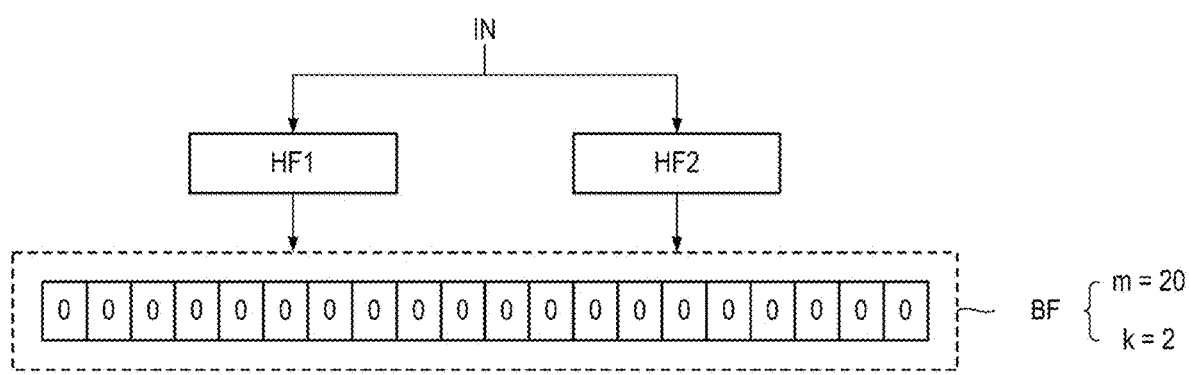
FIG. 2 illustrates a single bloom filter.

FIG. 2 illustrates a single bloom filter.

Referring to FIG. 2, illustratively, assuming that a single bloom filter BF with a data size of m (=20), the single bloom filter BF may use a plurality of hash functions HF1 and HF2 to distribute and map input data IN onto different bits. For example, when k=2, two hash values corresponding to the input data IN may be obtained through the two hash functions HF1 and HF2. The two hash values may indicate indexes of different bits included in the single bloom filter BF, and a corresponding index may change from a logic low to a logic high.

At this time, when a false positive probability capable of being defined as or based on a formula such as an exponential formula such as $(1-e^{-kn/m**})^k$ (where k is the number of hash functions, n is the number of pieces of input data IN, and m is a data size of the single bloom filter BF) wants to be reduced to efficiently use the single bloom filter BF, the number of the hash functions, k, will increase. As a result, the use of more hash functions will increase an operation load of the single bloom filter BF.

Figure 3:
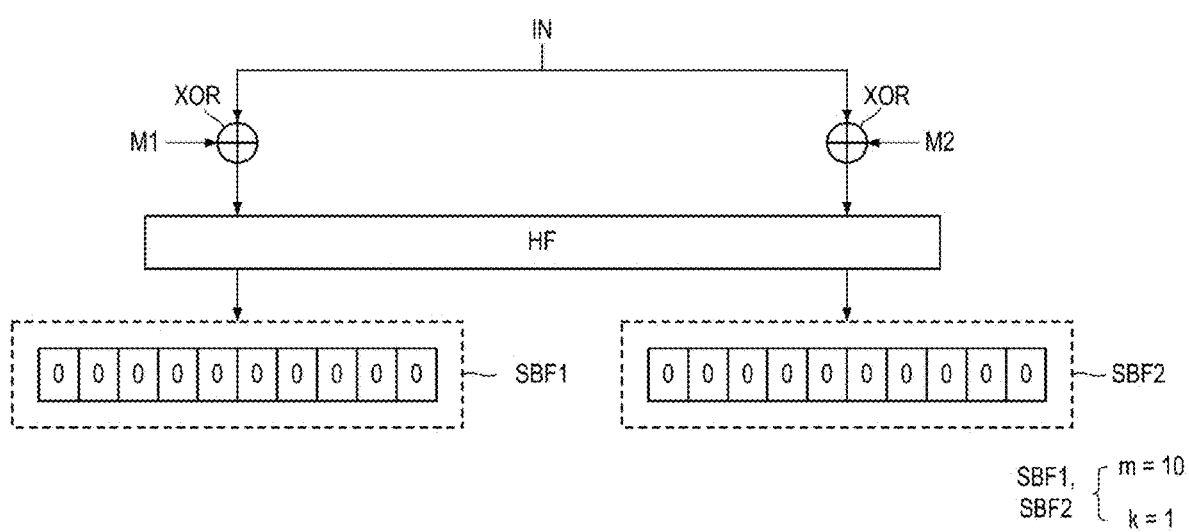
FIG. 3 illustrates a plurality of sub-bloom filters of the present disclosure according to some example embodiments.

FIG. 3 illustrates a plurality of sub-bloom filters of various example embodiments according to some example embodiments.

Referring to FIG. 3, a verification device (e.g., FIG. 1) according to some example embodiments may verify input data IN based on a plurality of divided sub-bloom filters which are replaced with a single bloom filter (e.g., FIG. 2).

The number of the divided sub-bloom filters may be defined as the number k of hash functions HF used for the single bloom filter. Furthermore, a data size of the divided sub-bloom filters may be defined as m/k. For example, the single bloom filter of FIG. 2 may be divided into two sub-bloom filters, each of which has a data size of 10. Of course, when more hash functions HF are used for the single bloom filter, more sub-bloom filters may be defined.

Particularly, as the sub-bloom filters are divided into a plurality of sub-bloom filters, only one hash function HF may be used. The one hash function HF may be commonly used in the plurality of sub-bloom filters.

The input data IN may be combined with a mask through an operator (e.g., an operator 120 of FIG. 1). For example, the operator may be an XOR operator (exclusive OR operator) as shown. The input data IN may be combined with a first mask M1 through a first operator to be provided to the hash function HF and may be combined with a second mask M2 through a second operator to be provided to the hash function HF.

The hash function HF may be commonly used in a first sub-bloom filter SBF1 and a second sub-bloom filter SBF2. Thus, the one hash function HF may provide the first sub-bloom filter SBF1 with a hash value for combination data provided through the first operator and may provide the second sub-bloom filter SBF2 with a hash value for combination data provided through the second operator.

FIGS. 4 to 8 illustrate a detailed operation of a plurality of sub-bloom filters of FIG. 3. Herein, it is assumed that all of values of bits stored in each sub-bloom filter are logic lows.

Figure 4:
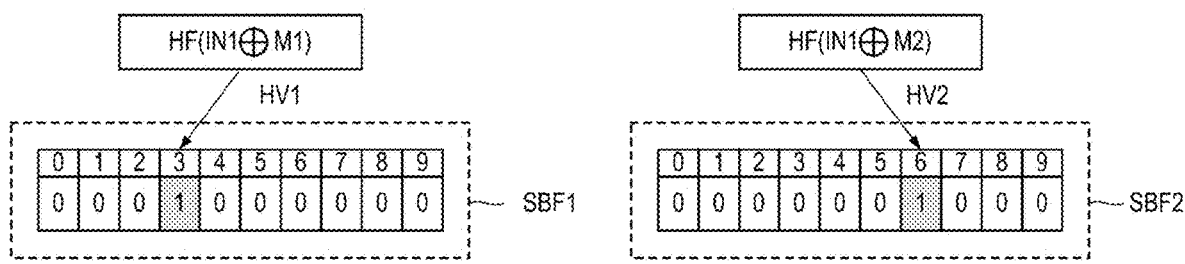
FIGS. 4, 5, 6, 7, and 8 illustrate a detailed operation of a plurality of sub-bloom filters of FIG. 3.

Referring to FIG. 4, assuming that first input data IN1 is input, one hash function HF may provide a first sub-bloom filter SBF1 with a first hash value HV1 for the result of XORing the first input data IN1 and a first mask M1. When the first hash value HV1 corresponds to index 3 of the first sub-bloom filter SBF1, a bit of index 3 may change to a logic high.

Furthermore, the one hash function HF may provide a second sub-bloom filter SBF2 with a second hash value HV2 for the result of XORing second input data IN2 and a second mask M2. When the second hash value HV2 corresponds to index 6 of the second sub-bloom filter SBF2, a bit of index 6 may change to the logic high.

Figure 5:
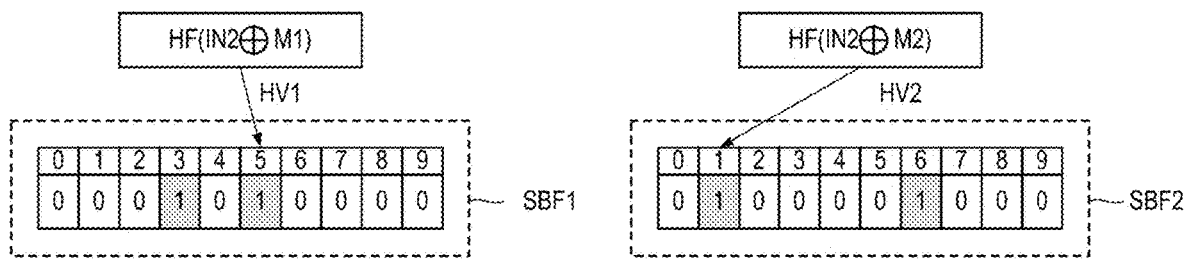

Thereafter, as shown in FIG. 5, assuming that second input data IN2 is input after the first input data IN1, the one hash function HF may provide the first sub-bloom filter SFB1 with a first hash value HV1 for the result of XORing the second input data IN2 and the first mask M1. When the first hash value HV1 corresponds to index 5 of the first sub-bloom filter SBF1, a bit of index 5 may change to the logic high.

Furthermore, the one hash function HF may provide the second sub-bloom filter SBF2 with a second hash value HV2 for the result of XORing the second input data IN2 and the second mask M2. When the second hash value HV2 corresponds to index 1 of the second sub-bloom filter SBF2, a bit of index 1 may change to the logic high.

Through FIGS. 4 and 5, the two pieces of input data (the first input data IN1 and the second input data IN2) are currently stored in the plurality of sub-bloom filters.

Figure 6:
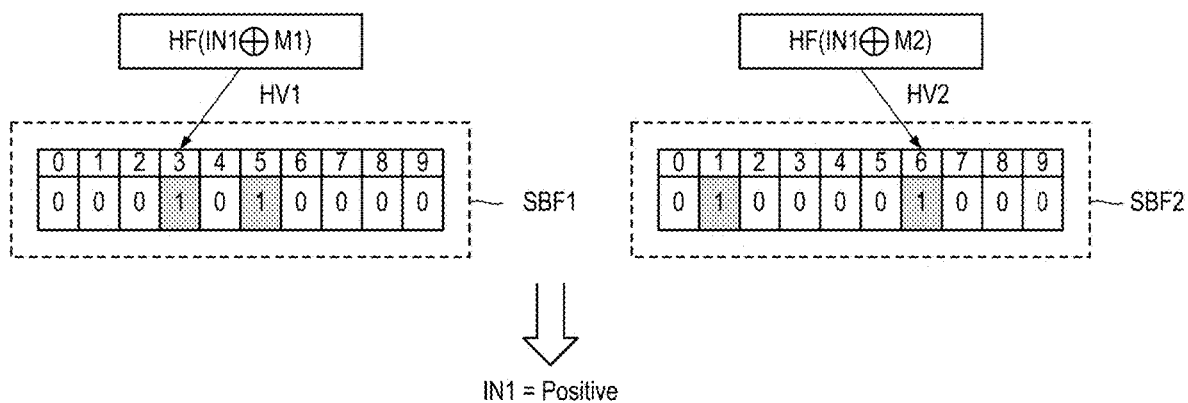

Thereafter, as shown in FIG. 6, assuming that the first input data IN1 is input to the hash function HF again, because the first input data IN1 is already registered in the plurality of sub-bloom filters, the bit of index 3 of the first sub-bloom filter SBF1 corresponding to the first hash value HV1 is the logic high and the bit of index 6 of the second sub-bloom filter SBF2 corresponding to the second hash value HV2 is also the logic high. Thus, because pieces of bit information of all the sub-bloom filters are the logic highs, whether the first input data IN1 is duplicated may be determined as a positive, e.g., as true.

Figure 7:
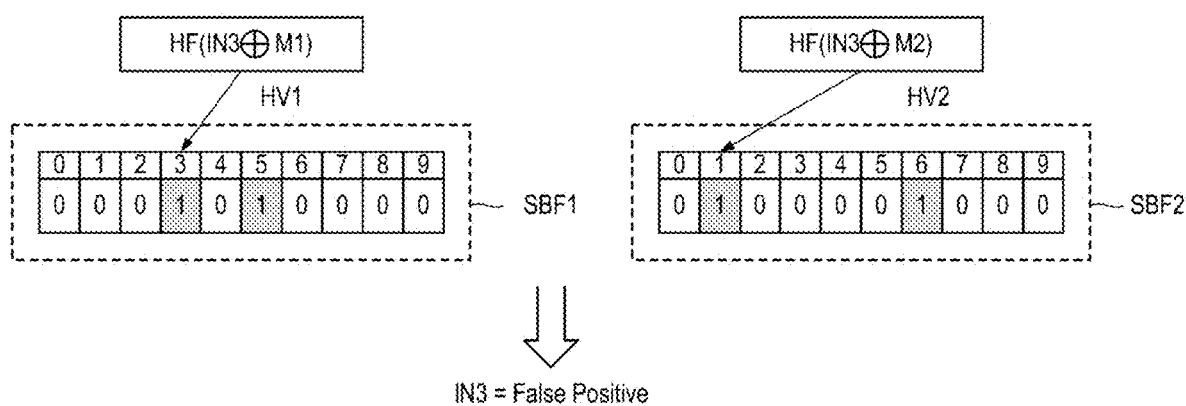

Alternatively, as shown in FIG. 7, assuming that third input data IN3 is input to the hash function HF, one hash function HF may provide the first sub-bloom filter SBF1 with a first hash value HV1 for the result of XORing the third input data IN3 and the first mask M1. However, the bit of index 3 of the first sub-bloom filter SBF1 corresponding to the first hash value HV1 is already the logic high.

Furthermore, the one hash function HF may provide the second sub-bloom filter SBF2 with a second hash value HV2 for the result of XORing the third input data IN3 and the second mask M2. Likewise, the bit of index 1 of the second sub-bloom filter SBF2 corresponding to the second hash value HV2 is already the logic high.

In particular, the third input data IN3 is not previously registered, but may be determined as the positive or true due to the first input data IN1 and the second input data IN2. This indicates the above-mentioned false positive situation. However, because the third input data IN3 is not used yet, even if it is determined as the positive or true, there is no room for the third input data IN3 to be reused.

Figure 8:
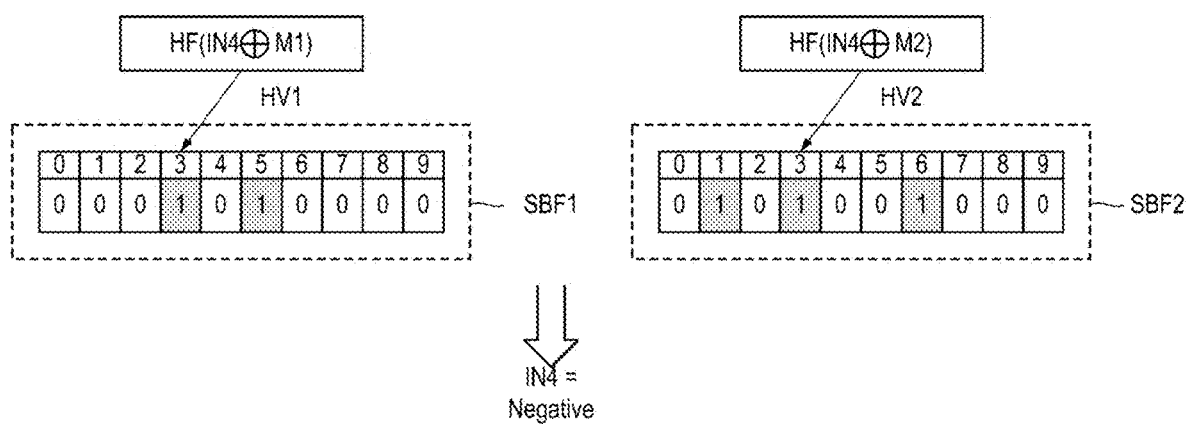

Alternatively or additionally, as shown in FIG. 8, assuming that fourth input data IN4 is input to the hash function HF, one hash function HF may provide the first sub-bloom filter SBF1 with a first hash value HV1 for the result of XORing the fourth input data IN4 and the first mask M1. However, the bit of index 3 of the first sub-bloom filter SBF1 corresponding to the first hash value HV1 is already logic high.

Furthermore, the one hash function HF may provide the second sub-bloom filter SBF2 with a second hash value HV2 for the result of XORing the fourth input data IN4 and the second mask M2. When the second hash value HV2 corresponds to index 3 of the second sub-bloom filter SBF2, the bit of index 3 may change to logic high.

As a result, because the first sub-bloom filter SBF1 indicates the logic high and the second sub-bloom filter SBF2 indicates the logic low for the fourth input data IN4, whether the fourth input data IN4 is duplicated may be determined as a negative. Thus, the fourth input data IN4 may be registered in the plurality of sub-bloom filters.

According to various example embodiments, the verification device of some example embodiments may decrease several hash functions HF to one hash function HF common to the plurality of sub-bloom filters, while dividing and using the single bloom filter into the plurality of sub-bloom filters, thus performing efficient data duplication verification.

As described above, a false positive probability of the single bloom filter may be defined as $$\left(1 - e^{-\frac{kn}{m}}\right)^k.$$

When the plurality of sub-bloom filters are used according to inventive concepts, a data size of each sub-bloom filter decreases to m/k and the number of hash functions HF decreases to "1". Thus, the false positive probability of each sub-bloom filter may be defined as $$1 - e^{-\frac{k'n}{m}}$$

(where k' is the number of the plurality of sub-bloom filters, that may be defined as is the same value as k). Furthermore, the false positive probability may be defined as $$\left(1 - e^{-\frac{k'n}{m}}\right)^{k'}$$

in terms of the plurality of sub-bloom filters. Thus, because the false positive probability when the single bloom filter is used and the false positive probability according to inventive concepts are almost similar values, performance associated with the false positive probability may be maintained in a similar level.

Figure 9:
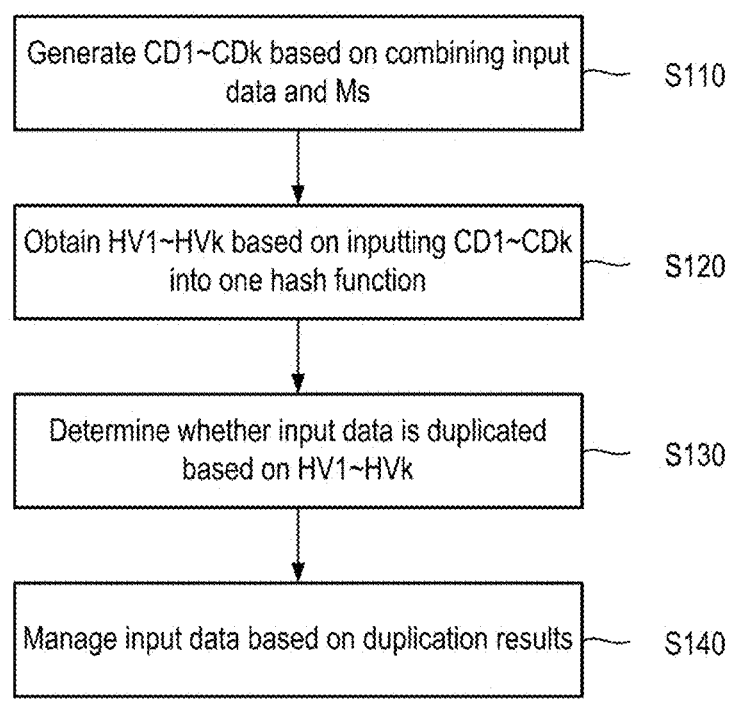
FIG. 9 is a flowchart of an operation method of a verification device of inventive concepts according to some example embodiments.

FIG. 9 is a flowchart of an operation method of a verification device according to some example embodiments.

Referring to FIG. 9, in operation S110, the verification device (e.g., FIG. 1) may combine input data and a plurality of masks Ms, each of which is uniquely assigned to one of a plurality of sub-bloom filters, to generate a plurality of pieces of combination data CD1 to CDk. According to some example embodiments, the verification device may further include generating the plurality of masks Ms. For example, the combining of the input data and each of the plurality of masks Ms may be performed based on XOR computation, concatenation, or the like.

In operation S120, the verification device may obtain a plurality of hash values HV1 to HVk, based on inputting the plurality of pieces of combination data CD1 to CDk into one hash function common to the plurality of sub-bloom filters. A different hash value may be obtained through the common hash function from each of the plurality of pieces of combination data.

In operation S130, the verification device may determine whether the input data is duplicated based on the plurality of hash values HV1 to HVk. For example, when all of the results of ANDing the plurality of hash values HV1 to HVk are logic highs, the verification device may determine whether the input data is duplicated as a positive. For example, when any one of the results of ANDing the plurality of hash values HV1 to HVk is a logic low, the verification device may determine whether the input data is duplicated as a negative.

In operation S140, the verification device may manage the input data after determining whether the input date is duplicated. For example, the verification device may reject input data that has been duplicated. Alternatively, the verification device may accept input data that has not been duplicated.

Figure 10:
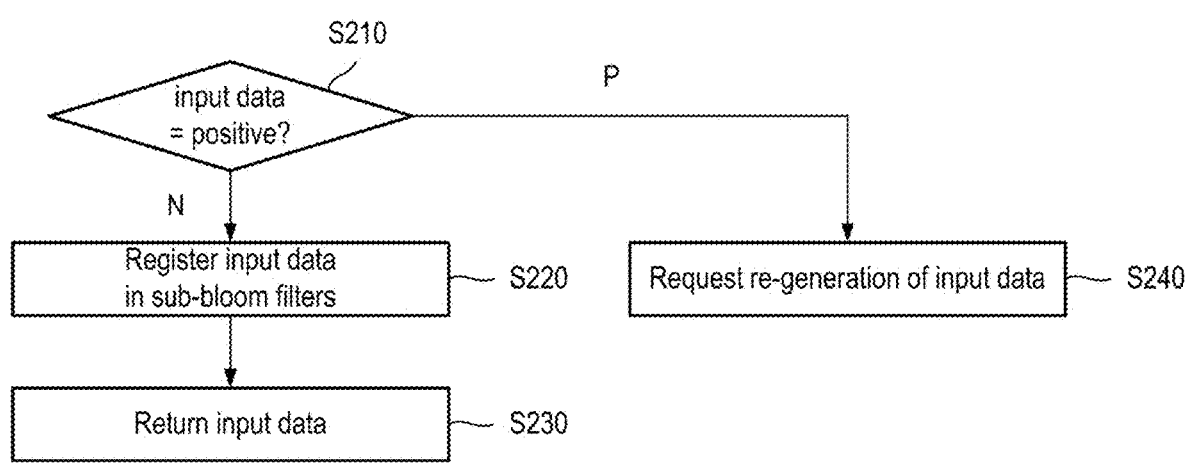
FIG. 10 is a flowchart of an operation method of a verification device of inventive concepts according to whether input data is duplicated according to some example embodiments.

FIG. 10 is a flowchart of an operation method of a verification device according to whether input data is duplicated according to some example embodiments.

Referring to FIG. 10, in operation S210, the verification device may determine whether input data is duplicated (as a positive or a negative).

Upon determining that the input data is not duplicated, in operation S220, the verification device may register the input data in a plurality of sub-bloom filters. Operation S220 may be performed based on that a bit of an index of each sub-bloom filter indicated by each of a plurality of hash values corresponding to the input data changes to a logic high.

In operation S230, the verification device may return the registered input data. The returned input data may be verified as not being reused.

Alternatively, when whether the input data is duplicated is determined as the positive in operation S210, in operation S240, the verification device may request an external device connected with the verification device to re-generate input data.

Figure 11:
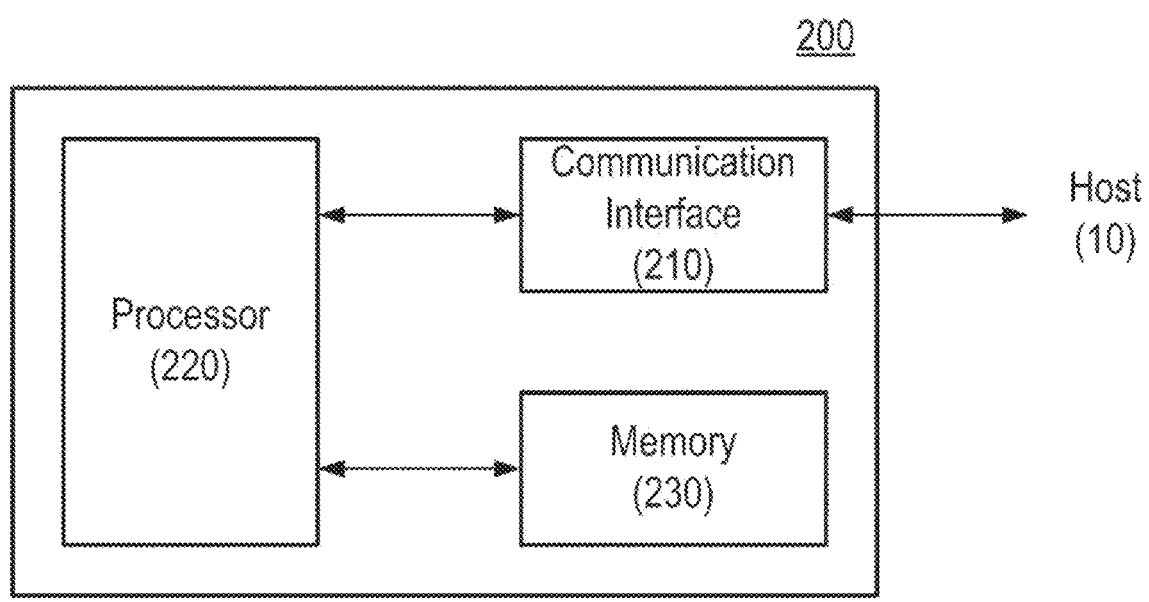
FIG. 11 illustrates a security device of inventive concepts according to some example embodiments.

FIG. 11 illustrates a security device according to some example embodiments.

Referring to FIG. 11, a security device 200 may be configured to be independent of another security device and may access only an authenticated application. The security device 200 may be configured to be physically separated from another hardware configuration and may be configured to perform encryption/decryption of data or perform a verification device (e.g., FIG. 1) according to the above-mentioned some example embodiments and an operation (e.g., FIGS. 3 to 10) or the verification device.

For example, one or more of a TEE, an embedded secure element (eSE), a universal integrated circuit card (UICC), a secure digital (SD) card, or an embedded UICC (eUICC), and other hardware/software may be mixed in the security device 200, or the security device 200 may include a separate security processing unit (SPU) in a hardware scheme or the like.

The security device 200 may include a communication interface 210, a processor 220, and a memory 230.

The communication interface 210 may be connected with a host 10 to communicate with the host 10. For example, the communication interface 210 may include various wired and wireless communication interfaces 210 for communicating with the host 10.

The processor 220 may be connected with the memory 230 to control the memory 230 and may be configured to execute at least one instruction stored in the memory 230 to implement a description, a function, a procedure, a proposal, a method, and/or operational flowcharts. For example, the processor 220 may provide operations according to various example embodiments based on the instruction stored in the memory 230. Furthermore, the processor 220 may process information stored in the memory 230 to generate data.

According to some example embodiments, the processor 220 may be a separate processor or may a core included in a multi-core processor. The multi-core processor may be one computing component with two or more independent processors. Each of the processors (or cores) may read and execute an instruction.

According to some example embodiments, the processor 220 may include one or more processing elements capable of being symmetric or asymmetric. The processing element may refer to hardware or logic for supporting a software thread. For example, a hardware processing element may include a thread unit, a thread slot, a thread, a process unit, a context, a context unit, a logical processor, a hardware thread, and a core. In other words, the processing element may refer to a code, such as a software thread, an operating system, or an application, or any hardware capable of being independently associated with the other codes.

According to some example embodiments, the processor 220 may be implemented as a general-purpose processor, a dedicated processor, an application processor (AP), or the like. For example, the processor 220 may be implemented as, but not limited to, one or more of an operation processor (e.g., a central processing unit (CPU), a graphic processing unit (GPU), or the like) including a dedicated logic circuit (e.g., a field programmable gate array (FPGA), application specific integrated circuits (ASICs), or the like).

The memory 230 may be connected with the processor 220 to store various pieces of information associated with an operation of the processor 220. For example, the memory 230 may perform some or all of processes or threads controlled by the processor 220 or may store a software code including at least one instruction for performing a description, a function, a procedure, a proposal, a method, and/or operational flowcharts of example embodiments. For example, the software code may be implemented in a procedural or object-oriented programming language or may be implemented in assembly language or machine language depending on a request. Alternatively or additionally, the software code may be implemented in a declarative programming language. Furthermore, embodiments may not be limited to any specific program language.

Various types of data, such as a security program and a file, may be installed and stored in the memory 230. For example, the memory 230 may store input data, a unique key for encryption/decryption, encrypted data, or at least one of a plurality of masks, combination data, a hash function, a hash value, and a plurality of sub-bloom filters according to the above-mentioned embodiments.

According to some example embodiments, the processor 220 may receive input data from the host 10 through the communication interface 210.

The processor 220 may perform encryption/decryption of the received input data.

When a nonce is used for the encryption/decryption of the received input data, the processor 220 may verify the nonce.

According to some example embodiments, the processor 220 may combine a nonce and a plurality of masks to generate a plurality of pieces of combination data and may obtain a plurality of hash values based on inputting the plurality of pieces of combination data into one hash function common to a plurality of sub-bloom filters stored in the memory 230. For example, the processor 220 may XOR or concatenate the nonce and the plurality of mask to generate the plurality of pieces of combination data.

The processor 220 may determine whether the nonce is duplicated based on the plurality of obtained hash values.

The processor 220 may determine whether the nonce is duplicated based on comparing one hash value among the plurality of hash values with one sub-bloom filter corresponding to the one hash value among the plurality of sub-bloom filters. When a value of a bit corresponding to the one hash value in the one sub-bloom filter is a logic low, the processor 220 may determine that the nonce is not duplicated. In other words, when there is a negative in any one sub-bloom filter, the processor 220 may determine that the nonce is not duplicated.

When the processor 220 determines that the nonce is not duplicated, the processor 220 may register the nonce in a plurality of bits corresponding to the plurality of hash values among the plurality of sub-bloom filters. Thus, bits of indexes corresponding to the plurality of hash values among bits of at least some sub-bloom filters may change to logic highs.

Alternatively, the processor 220 may determine that the nonce is duplicated, based on that values of all bits respectively corresponding to the plurality of hash values in the plurality of sub-bloom filters are the logic highs. In other words, only when there is a positive in all the sub-bloom filters, the processor 220 may determine that the nonce is duplicated.

Alternatively, the processor 220 may verify the received input data according to the above-mentioned embodiments.

In addition, the processor 220 may perform an operation or a function according to FIGS. 1 and 3 to 10 described above.

According to various example embodiments, the security device 200 may decrease several hash functions to one hash function common to the plurality of sub-bloom filters, while dividing and using the single bloom filter into the plurality of sub-bloom filters, thus performing efficient data duplication verification.

Figure 12:
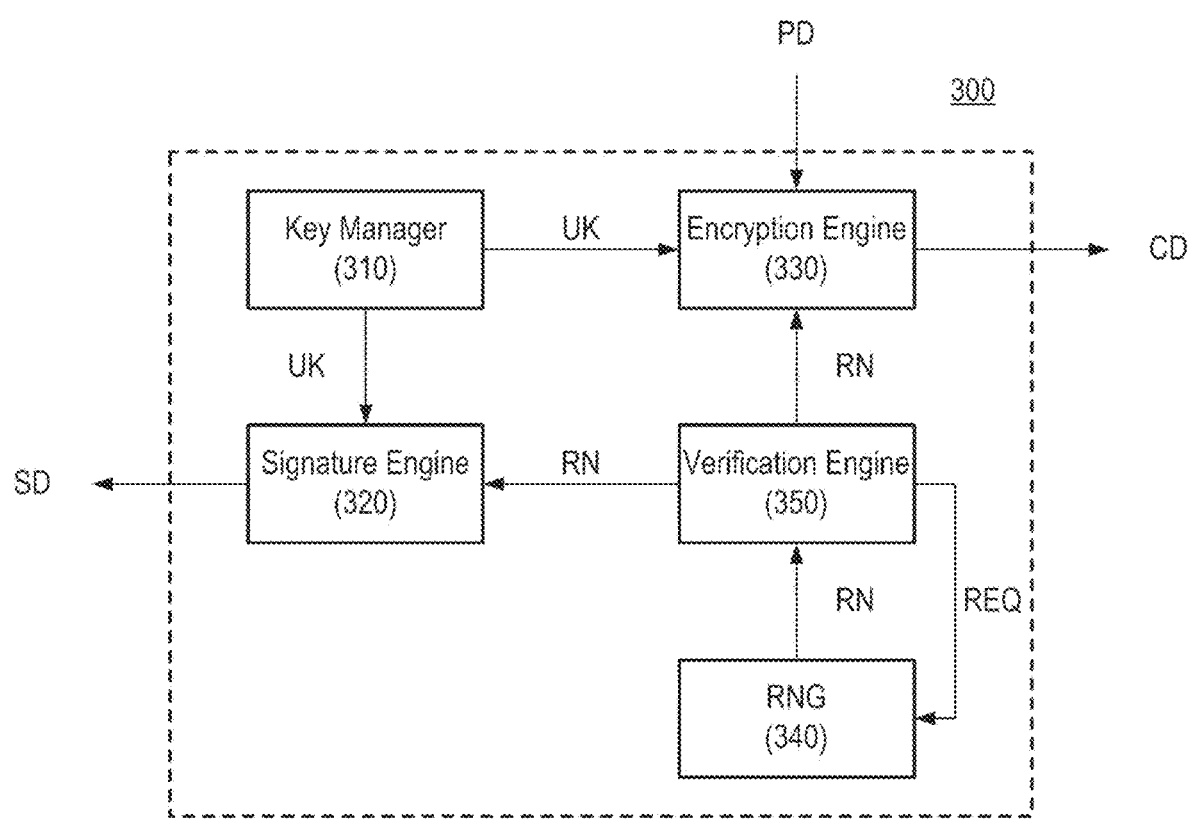
FIG. 12 illustrates a security device of inventive concepts according to some example embodiments.

FIG. 12 illustrates a security device according to some example embodiments.

Referring to FIG. 12, a security device 300 may be configured to receive plaintext data PD from an external device (e.g., a host 10 of FIG. 11) connected with the security device 300 and encrypt the plaintext data PD to output ciphertext data CD. For example, the security device 300 may be implemented as a hardware security module (HSM).

The security device 300 may include a key manager 310, a signature engine 320, an encryption engine 330, a random number generator 340, and a verification engine 350.

The key manager 310 may store and manage a unique key UK unique to the security device 300 and may provide the signature engine 320 and the encryption engine 330 with the unique key UK. For example, the unique key UK may not be changed and/or accessed by other objects connected with the security device 300 and may be provided to only the security device 300.

The signature engine 320 may perform signature authentication based on the unique key UK provided from the key manager 310 and/or a random number RN provided from the random number generator 340. For example, the signature engine 320 may perform signature authentication for a firmware image provided from the outside of the security device 300 or data needing authentication and may output signature data SD, the signature authentication of which is completed.

The encryption engine 330 may encrypt the plaintext data PD input from the outside of the security device 300 to output the ciphertext data CD, based on the unique key UK provided from the key manager 310 and/or the random number RN. For example, the encryption engine 330 may encrypt input data based on an encryption algorithm, such as one or more of data encryption standard (DES), 3DES, advanced encryption standard (AES), or SEED.

The random number generator 340 may generate and provide a random number RN for signature authentication and/or a random number RN for encryption. Particularly, a random number RN which should be used only once for signature authentication or encryption among random numbers RN generated from the random number generator 340 may be defined as the above-mentioned nonce. Thus, it may be required or desired to track the random number RN provided from the random number generator 340 to the signature engine 320 or the encryption engine 330.

The verification engine 350 may be connected with the random number generator 340 to verify, manage, and track membership of the random number RN to be provided to the signature engine 320 or the encryption engine 330. The verification engine 350 may be configured and operated according to the above-mentioned embodiments (e.g., FIGS. 1 and 3 to 11).

When receiving the random number RN from the random number generator 340, the verification engine 350 may determine whether the random number RN is duplicated. According to some example embodiments, the verification engine 350 may combine the random number RN and a plurality of masks, each of which is uniquely assigned to one of a plurality of sub-bloom filters, to generate a plurality of pieces of combination data. The verification engine 350 may obtain a plurality of hash values, based on inputting the plurality of pieces of combination data into one hash function common to the plurality of sub-bloom filters. The verification engine 350 may determine whether the random number RN is duplicated based on the plurality of obtained hash values.

For example, when any one of values of bits corresponding to the plurality of hash values in the plurality of sub-bloom filters is a logic low (e.g., a negative), the verification engine 350 may determine that the random number RN is not duplicated. Then, the verification engine 350 may identify that the membership of the random number RN is verified and may register the provided random number RN in the plurality of sub-bloom filters. Furthermore, the verification engine 350 may provide the signature engine 320 or the encryption engine 330 with the random number RN, based on determining that the random number RN is not duplicated.

Alternatively or additionally, when all the values of the bits corresponding to the plurality of hash values in the plurality of sub-bloom filters are logic highs (i.e., positives), the verification engine 350 may determine that the random number RN is duplicated. The positive may include a false positive considering the characteristics of the bloom filter. However, when it is possible to track duplication of the random number RN by means of the verification engine 350, a problem in which the random number RN is reused in the signature engine 320 or the encryption engine 330 may be at least prevented.

The verification engine 350 may transmit a random number re-generation request REQ to the random number generator 340, based on that it is determined that the random number RN is duplicated. When receiving the random number re-generation request REQ, the random number generator 340 may re-generate a random number RN and may provide the verification engine 350 with the random number RN again.

As a result, as the random number RN is registered in the plurality of sub-bloom filters after being used and the membership is verified for the plurality of sub-bloom filters before the random number RN is used, by means of the verification engine 350, it may be identified that the random number RN is (or may have been) used or has definitely never been used.

Thus, the security device 300 of may prevent or reduce the likelihood of the random number RN from being reused, even if using only one hash function. Furthermore, when the unique key UK used for encryption has a long-term attribute, the duplicated use of the random number RN may be fatal, but the reuse of the random number RN may be prevented or reduced by implanting various example embodiments.

Figure 13:
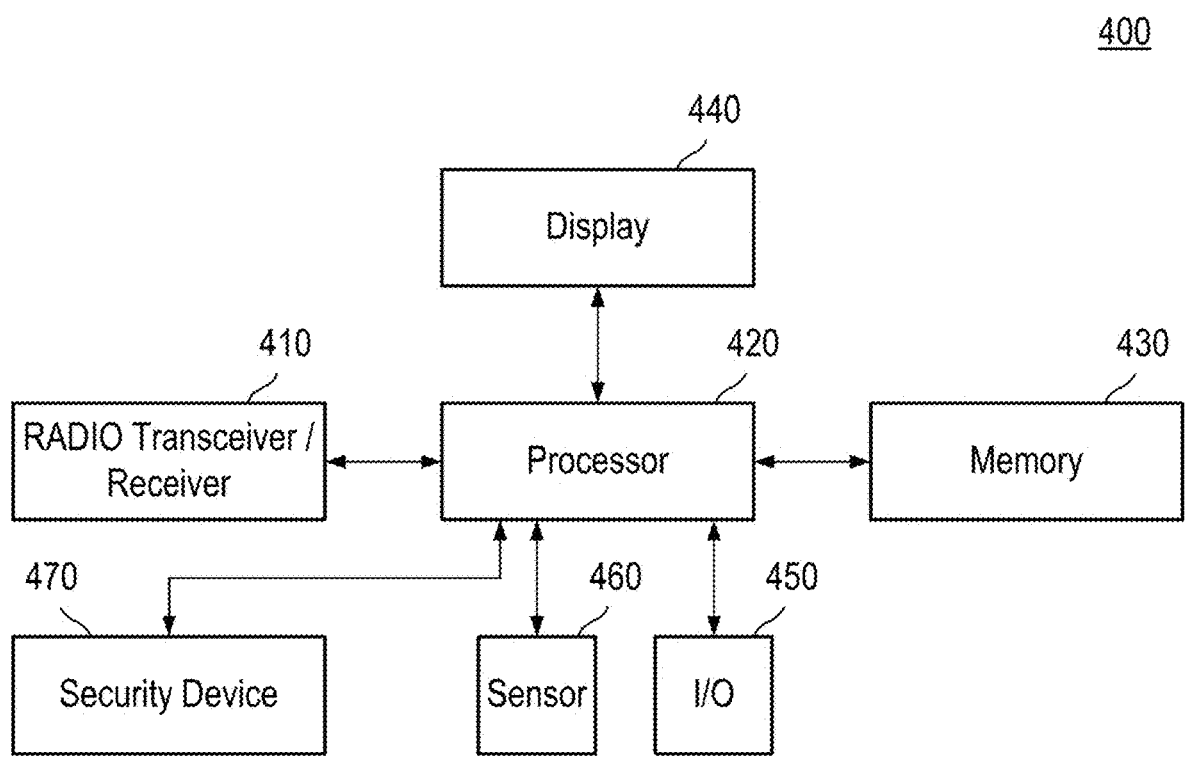
FIG. 13 illustrates an Internet of things (IoT) device to which a wireless communication device is applied according to some example embodiments.

FIG. 13 illustrates an Internet of things (IoT) device to which a security device is applied according to some example embodiments.

Referring to FIG. 13, the IoT may refer to a network between things which use wired and/or wireless communication. An IoT device 400 may have an accessible wired or/and wireless interface and may include devices which communicate with at least one or more other devices through the wired or/and wireless interface to transmit or receive data. The accessible interface of the IoT device 400 may include a modem communication interface capable of accessing one or more of a local area network (LAN), a wireless local area network (WLAN), such as a wireless fidelity (Wi-Fi), a wireless personal area network (WPAN), such as Bluetooth, a wireless universal serial bus (USB), a ZigBee, near field communication (NFC), radio-frequency identification (RFID), power line communication (PLC), or a mobile cellular network, such as 3rd generation (3G), long term evolution (LTE), 4th generation (4G), or 5th generation (5G). In some example embodiments, the Bluetooth interface may support Bluetooth low energy (BLE).

In detail, the IoT device 400 may include a communication interface 410 (a RADIO transceiver/receiver) for communicating with the outside. The communication interface 410 may be or include or be included in, for example, one or more of a modem communication interface capable of accessing a LAN, a wireless short range communication interface, such as Bluetooth, Wi-Fi, or ZeeBee, PLC, or a mobile communication network, such as 3G, LTE, 4G, or 5G. The communication interface 410 may include a transceiver and/or a receiver. The IoT device 400 may transmit and/or receive information from an access point or a gateway through the transceiver and/or the receiver. Furthermore, the IoT device 400 may communicate with a user device or another IoT device to transmit and/or receive control information or data of the IoT device 400.

The IoT device 400 may further include a processor or an application processor (AP) 420, which performs computation. The IoT device 400 may further include an embedded battery for supplying internal power or a power supply unit for receiving power from the outside. Furthermore, the IoT device 400 may include a display 440 for displaying an internal state or data. A user may control the IoT device 400 through a user interface (UI) of the display 440 in the IoT device 400. The IoT device 400 may transmit the internal state and/or the data to the outside through the transceiver and may receive a control instruction and/or data from the outside through the receiver.

A memory 430 may store a control instruction code for controlling the IoT device 400, control data, or user data. The memory 430 may include at least one of a volatile memory or a nonvolatile memory. The nonvolatile memory includes at least one of various memories such as a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (ReRAM), and a ferroelectric RAM (FRAM). The volatile memory may include at least one of various memories such as a dynamic RAM (DRAM), a static RAM (SRAM), and a synchronous DRAM (SDRAM).

The IoT device 400 may further include a storage device. The storage device may include at least one of nonvolatile media such as one or more of a hard disk drive (HDD) a solid state drive (SSD), an embedded multimedia card (eMMC), and universal flash storage (UFS). The storage device may store user information provided through an input/output unit (I/O) 450 and pieces of sensing information collected through a sensor 460.

The IoT device 400 may further include a security device 470 connected with the processor 420. The security device 470 may be configured according to the above-mentioned embodiments (e.g., FIG. 1, FIGS. 3 to 12) or may perform operations and functions of the above-mentioned embodiments.

The security device 470 may receive plaintext data needing encryption from the processor 420 and may encrypt the plaintext data based on a unique key and/or a random number. Alternatively or additionally, the security device 470 may decrypt ciphertext data.

According to some example embodiments, the security device 470 may determine whether the random number is duplicated, based on a plurality of sub-bloom filter configured to have one common hash function.

Figure 14:
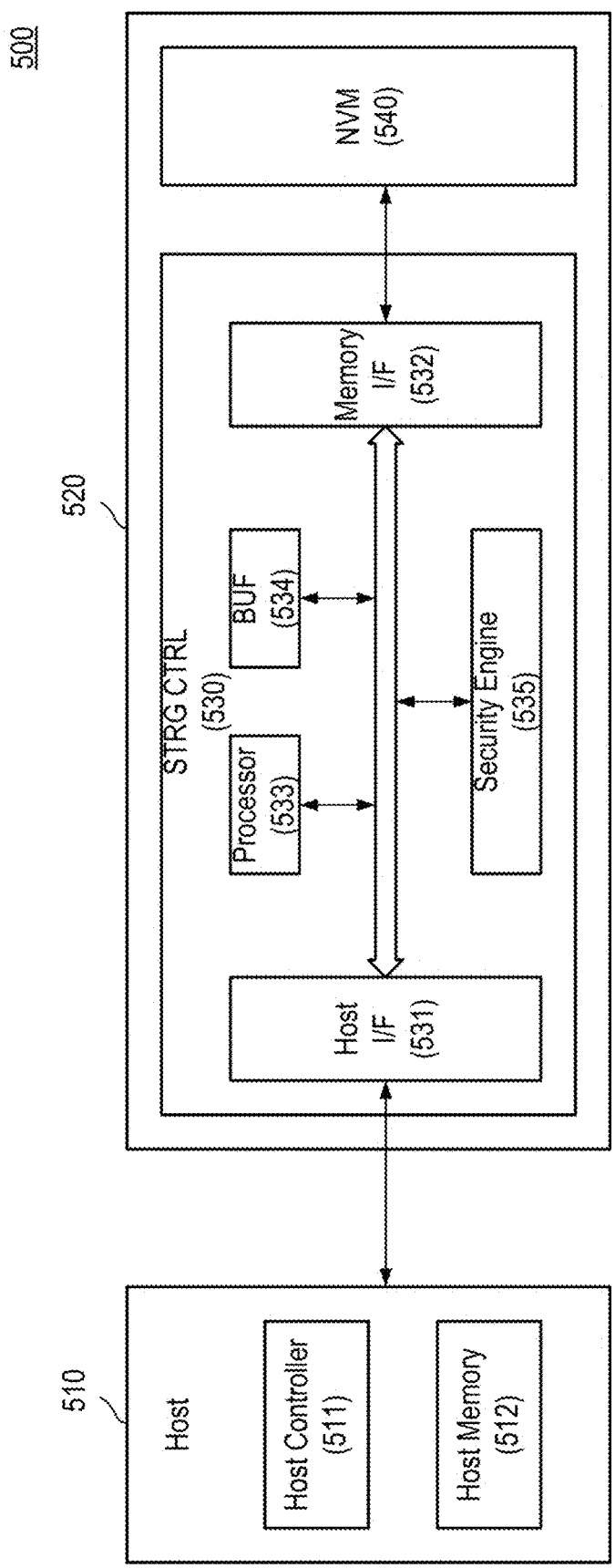
FIG. 14 illustrates a storage system of inventive concepts according to some example embodiments.

FIG. 14 illustrates a storage system of inventive concepts according to some example embodiments.

Referring to FIG. 14, a storage system 500 may include a host 510 and a storage device 520.

The host 510 may include a host controller 511 and a host memory 512. The host memory 512 may function as a buffer memory for temporarily storing data to be transmitted to the storage device 520 or data transmitted from the storage device 520.

The host 510 may include, for example, one or more of a personal computer (PC), a laptop, a mobile phone, a smartphone, a tablet PC, or the like.

The storage device 520 may include a storage controller 530 and a nonvolatile memory device (NVM) 540. The storage device 520 may include storage media for storing data depending on a request from the host 510. As an example, the storage device 520 may include at least one of a solid state drive (SSD), an embedded memory, and a removable external memory. When the storage device 520 is an SSD, it may be a device complying with the nonvolatile memory express (NVMe) standard. When the storage device 520 is an embedded memory or an external memory, it may be a device complying with the universal flash storage (UFS) or embedded multi-media card (eMMC) standard.

Each of the host 510 and the storage device 520 may generate a packet complying with a standard protocol applied thereto and may transmit the generated packet.

When the nonvolatile memory device 540 of the storage device 520 includes a flash memory, the flash memory may include a two-dimensional (2D) NAND memory array and/or a three-dimensional (3D) (or vertical) NAND (VNAND) memory array. Alternatively or additionally, the storage device 520 may include various different types of nonvolatile memories. For example, the storage device 520 may include one or more of a magnetic RAM (MRA), a spin-transfer torque MRAM (STT-MRAM), a conductive bridging RAM (CBRAM), a ferroelectric RAM (FeRAM), a phase RAM (PRAM), a resistive RAM (RRAM), and various different types of memories.

In some example embodiments, the host controller 511 and the host memory 512 may be implemented as separate semiconductor chips. Alternatively, in some example embodiments, all or at least a portion of the host controller 511 and the host memory 512 may be integrated into the same semiconductor chip. For example, the host controller 511 may be any one of a plurality of modules included in an application processor. The application processor may be implemented as a system on chip (SoC). Furthermore, the host memory 512 may be an embedded memory included in the application processor or may be a nonvolatile memory or a memory module disposed outside the application processor.

The host controller 511 may manage an operation of storing data (e.g., write data) of a buffer area in the nonvolatile memory 540 or storing data (e.g., readout data) of the nonvolatile memory 540 in the buffer area.

The storage controller 530 may include a host interface (I/F) 531, a memory I/F 532, a processor 533, a buffer memory (BUF) 534, and an encryption engine 535. Furthermore, the storage controller 530 may further include a flash translation layer (FTL) for performing a function, such as address mapping, wear-leveling, or garbage collection, a packet manager for generating a packet depending on a protocol agreed with the host 510 or parsing a packet received from the host 510, an error correction code (ECC) engine for performing an error detection and correction function for readout data read out from the nonvolatile memory 540, and the like, depending on its implementation.

The host I/F 531 may transmit and receive a packet with the host 510. The packet transmitted from the host 510 to the host I/F 531 may include a command, data to be written in the nonvolatile memory 540, or the like. The packet transmitted from the host I/F 531 to the host 510 may include a response to the command, data read out from the nonvolatile memory 540, and/or the like. The memory I/F 532 may transmit data to be written in the nonvolatile memory 540 to the nonvolatile memory 540 or may receive data read out from the nonvolatile memory 540. The memory I/F 532 may be implemented to comply with the standard protocol such as Toggle or open NAND flash interface (ONFI).

The processor 533 may perform a data write and readout operation for the nonvolatile memory 540.

The encryption engine 535 may perform at least one of an encryption operation and a decryption operation for data input from the storage controller 530, based on various encryption algorithms.

Figure 15:
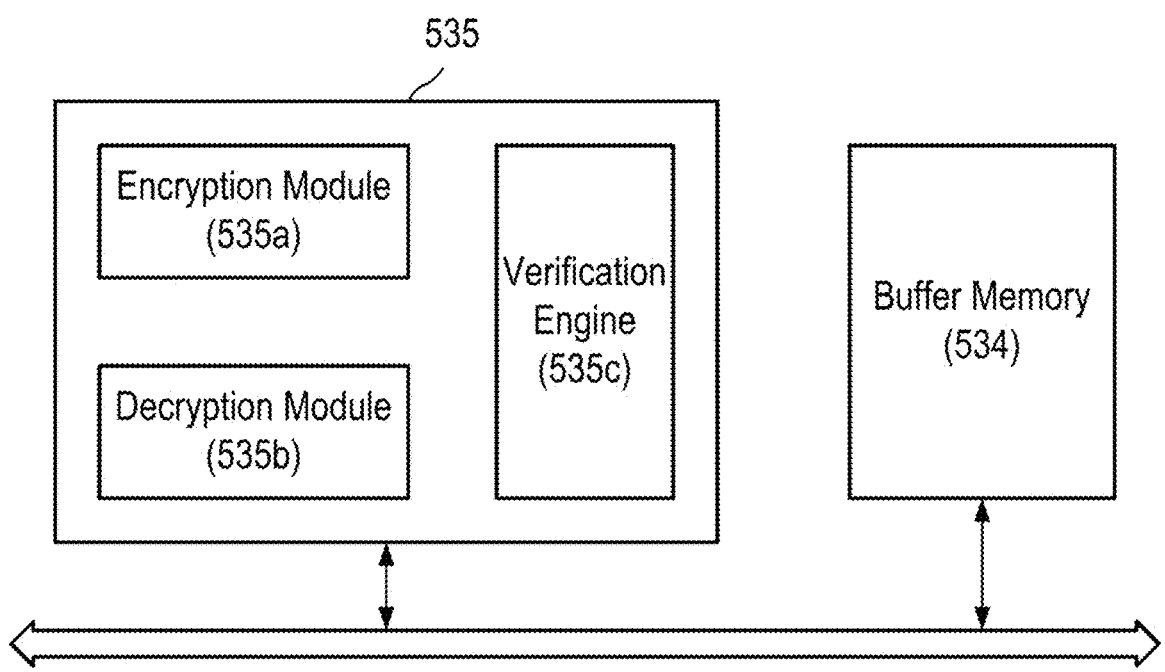
FIG. 15 illustrates an encryption engine of FIG. 14 according to some example embodiments.

FIG. 15 illustrates an encryption engine of FIG. 14 according to some example embodiments.

Referring to FIG. 15, an encryption engine 535 may perform encryption and decryption of data using, for example, an advanced encryption standard (AES) algorithm and/or a secure hash function (SHA)-based algorithm. The encryption engine 535 may include an encryption module 535a and a decryption module 535b. The encryption module 535a and the decryption module 535b may be implemented as one module according to an embodiment. A buffer memory 534 may be or may include a volatile memory which serves as a buffer, but may alternatively or additionally be or include a nonvolatile memory.

The encryption engine 535 may receive first data transmitted from the buffer memory 534. The encryption module 535a may encrypt the first data transmitted from the buffer memory 534 using an encryption key to generate second data and may transmit the second data to the buffer memory 534.

According to some example embodiments, the encryption engine 535 may be implemented based on FIGS. 1 and 3 to 12 described above. The encryption engine 535 may verify a random number to be used when encrypting the first data. In detail, the encryption engine 535 may determine whether the random number is duplicated, based on a plurality of sub-bloom filter configured to have one common hash function. When the encryption engine 535 determines that the random number is duplicated, the encryption engine 535 may re-generate a random number and may redetermine whether the re-generated random number is duplicated. When the random number is not duplicated, the encryption engine 535 may register the random number in the plurality of sub-bloom filters and may use the random number for encryption.

Furthermore, the encryption engine 535 may receive third data transmitted from the buffer memory 534. The third data may be data encrypted with the same encryption key as the encryption key used to encrypt the first data. The decryption module 535b may decrypt the third data transmitted from the buffer memory 534 with the same encryption key as the encryption key used to encrypt the first data to generate fourth data. The fourth data may be transmitted from the encryption engine 535 to the buffer memory 534.

According to some example embodiments, the security device capable of efficiently verifying the nonce and/or the operation method thereof are provided.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

The above-mentioned contents are detailed some example embodiments for executing inventive concepts. Inventive concepts may include embodiments in which a design is changed simply or which are easily changed, other than the above-mentioned example embodiments. Furthermore, inventive concepts may include technologies capable of being easily modified and executed using embodiments. While the various inventive concepts have been described with reference to embodiments thereof, it will be apparent to those of ordinary skill in the art that various changes and modifications may be made thereto without departing from the spirit and scope of example embodiments as set forth in the following claims. Additionally, example embodiments are not necessarily mutually exclusive with one another. For example, some example embodiments may include one or more features described with reference to one or more figures, and may also include one or more other features described with reference to one or more other figures.

What is claimed is:

1. A security device, comprising:
    a memory; and
    a processor connected with the memory and configured to execute at least one instruction,
    wherein the processor is configured to execute the at least one instruction to cause the security device to:
    generate a plurality of pieces of combination data by combining input data and a plurality of masks, each of the plurality of masks uniquely assigned to one of a plurality of sub-bloom filters,
    obtain a plurality of hash values, based on inputting the plurality of pieces of combination data into one hash function common to the plurality of sub-bloom filters; and
    determine whether the input data is duplicated based on the plurality of hash values.

2. The security device of claim 1, wherein the processor is configured to execute the at least one instruction to:
    compare one hash value among the plurality of hash values with one sub-bloom filter corresponding to the one hash value among the plurality of sub-bloom filters; and
    determine that the input data is not duplicated, based on a value of a bit corresponding to the one hash value in the one sub-bloom filter being a first logic value.

3. The security device of claim 2, wherein the processor is configured to execute the at least one instruction to:
    determine that the input data is duplicated, based on values of all bits respectively corresponding to the plurality of hash values in the plurality of sub-bloom filters being a second logic value, different from the first logic value.

4. The security device of claim 1, wherein the processor is configured to execute the at least one instruction to:
    register the input data in a plurality of bits corresponding to the plurality of hash values among the plurality of sub-bloom filters, based on determining that the input data is not duplicated.

5. The security device of claim 1, wherein the input data includes a nonce.

6. The security device of claim 1, wherein the processor is configured to execute the at least one instruction to:
    generate the plurality of masks based on a random number generator.

7. The security device of claim 1, wherein the plurality of sub-bloom filters are configured to have the same size as each other.

8. The security device of claim 1, wherein one of the plurality of hash values corresponds to one index included in one of the plurality of sub-bloom filters.

9. The security device of claim 1, wherein the processor is configured to execute the at least one instruction to:
    generate the plurality of pieces of combination data based on XORing the input data and each of the plurality of masks.

10. The security device of claim 1, wherein the processor is configured to execute the at least one instruction to:

generate the plurality of pieces of combination data based on concatenating each of the plurality of masks to the input data.

11. An operation method of a security device, the operation method comprising:
 generating a plurality of pieces of combination data by combining input data and a plurality of masks, each of the plurality of masks uniquely assigned to one of a plurality of sub-bloom filters;
 obtaining a plurality of hash values, based on inputting the plurality of pieces of combination data into one hash function common to the plurality of sub-bloom filters; and
 determining whether the input data is duplicated based on the plurality of hash values.

12. The operation method of claim 11, wherein the determining of whether the input data is duplicated includes:
 comparing one hash value among the plurality of hash values with one sub-bloom filter corresponding to the one hash value among the plurality of sub-bloom filters; and
 determining that the input data is not duplicated, based on a value of a bit corresponding to the one hash value in the one sub-bloom filter is a first logic value.

13. The operation method of claim 12, wherein the determining of whether the input data is duplicated includes:
 determining that the input data is duplicated, based on values of all bits respectively corresponding to the plurality of hash values in the plurality of sub-bloom filters are a second logic value, different from the first logic value.

14. The operation method of claim 11, further comprising:
 registering the input data in a plurality of bits corresponding to the plurality of hash values among the plurality of sub-bloom filters, based on determining that the input data is not duplicated.

15. The operation method of claim 11, wherein the plurality of sub-bloom filters are configured to have the same size as each other.

16. A security device, comprising:
 a random number generator configured to generate a random number;
 an encryption engine configured to perform encryption of plaintext data based on a unique key and the random number, and to output ciphertext data; and
 a verification engine configured to determine whether the random number is duplicated,
 wherein the verification engine is configured to:
 generate a plurality of pieces of combination data by combining the random number and a plurality of masks, each of the plurality of masks uniquely assigned to one of a plurality of sub-bloom filters, to obtain a plurality of hash values, based on inputting the plurality of pieces of combination data into one hash function common to the plurality of sub-bloom filters, and to determine whether the random number is duplicated based on the plurality of hash values.

17. The security device of claim 16, wherein the verification engine is configured to:
 register the random number in a plurality of bits corresponding to the plurality of hash values among the plurality of sub-bloom filters, based on determining that the random number is not duplicated.

18. The security device of claim 16, wherein the verification engine is configured to:
 provide the encryption engine with the random number, based on determining that the random number is not duplicated.

19. The security device of claim 16, wherein the verification engine is configured to:
 transmit a random number re-generation request to the random number generator, based on that determining that the random number is duplicated.

20. The security device of claim 19, wherein the random number generator is configured to re-generate the random number, based on receiving the random number re-generation request.

* * * * *